United States Patent Office 3,191,969
Patented June 29, 1965

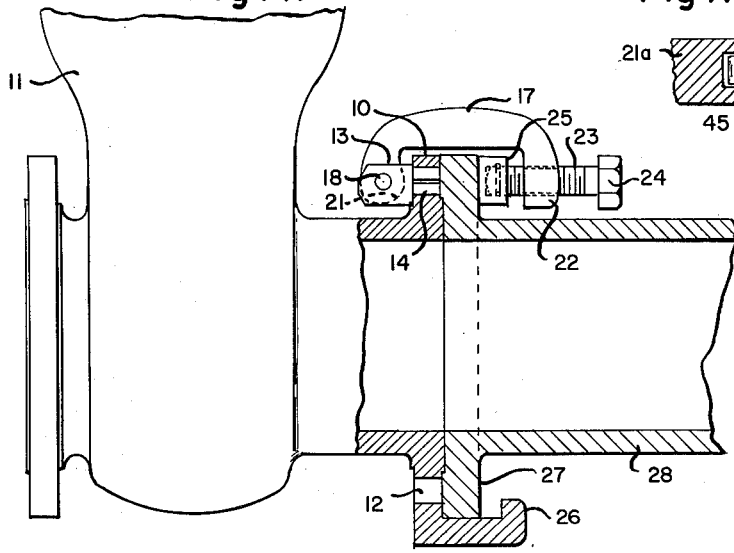
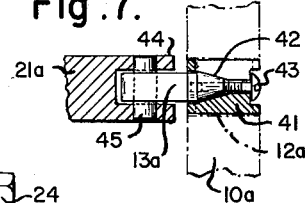
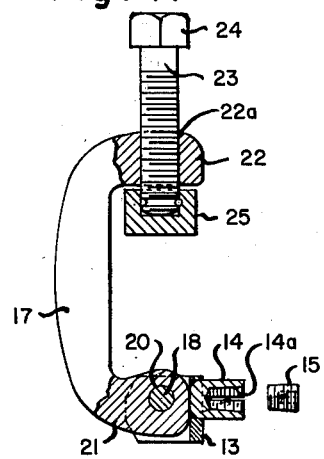
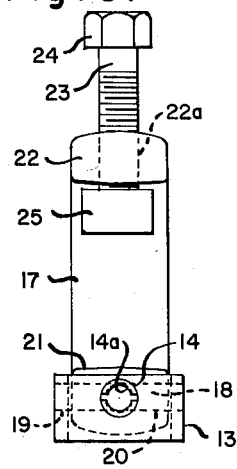
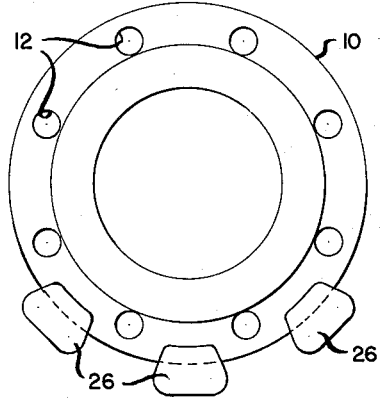
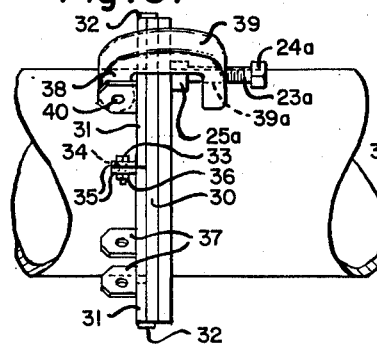
June 29, 1965    E. N. WRENSHALL    3,191,969
FLANGE COUPLING
Filed May 10, 1960
INVENTOR
Edward N. Wrenshall

3,191,969
FLANGE COUPLING
Edward N. Wrenshall, Pittsburgh, Pa., assignor to Miller Printing Machinery Company, a corporation of Pennsylvania
Filed May 10, 1960, Ser. No. 28,129
2 Claims. (Cl. 285—24)

This invention relates to flange couplings and particularly to a quick coupling flange for pipe lines, valves and the like.

Many industrial installations require the use of flanged connections which must be broken from time to time for one reason or the other. Such connections are frequently the source of much lost time and many difficulties, depending upon the weather condition and the location of the connection, for example, it is common practice in the petroleum industry to ship petroleum products in large barges from which the petroleum products are pumped into tanks on the shore through large diameter hoses (about 8 inches in diameter). These hoses are fixed to the barge at one end and the opposite free end is provided with a metal flange having holes therethrough. This flange must be mated with a corresponding flange on a valve on a permanent shore installation and fastened by passing bolts through the matching holes. This hose and its associated flange are extremely heavy and it is difficult to pass bolts through the holes. As a result, both the hose and the bolts are frequently dropped into the water and considerable time is consumed in making the connection.

I provide in a preferred embodiment of my invention, a yoke pivoted on a flange to be connected, an arm of the yoke being adapted to reach over a second flange to be connected and means on the arm adapted to force the second flange into mating contact with the first flange. Preferably, the yoke is in the form of a C-clamp one end pivot on the rear surface of one flange and the other end adapted to lie behind the other flange to be connected, and screw means in said other end adapted to engage the said other flange to force it into engagement with the said one flange. Flange support means may be fixed to one flange to aid in aligning the flanges.

In the foregoing statement I have outlined certain purposes, advantages, and objects of my invention. Other purposes, objects and advantages will be apparent from a consideration of the following description and the accompanying drawings in which:

FIGURE 1 is a vertical section through a flange embodying the preferred form of my invention;

FIGURE 2 is an end elevation of the valve flange of FIGURE 1;

FIGURE 3 is an enlarged end elevation of the yoke structure of FIGURES 1 and 2;

FIGURE 4 is a side elevation of the yoke structure of FIGURE 3, partly in section;

FIGURE 5 is a side elevation of an alternative embodiment of my invention;

FIGURE 6 is an end elevation viewed from the left of FIGURE 5; and

FIGURE 7 is a section through an alternative form of yoke holding device.

Referring to the drawings, I have illustrated a flange 10 on a valve housing 11 such as would be used in the petroleum industry and the like. The flange 10 is provided with bolt holes 12 in usual manner. A pivot member 13 extends rearwardly of flange 10 from each bolt 12 and is held in the bolt hole 12 by means of an expandable, knurled annular hollow pin 14 which is forced to expand by riding up a conical screw 15 which is threaded into threads 14a in pin 14. The pivot member 13 pivotally carries a C-clamp member 17 on a pin 18 extending through a hole 19 in the pivot member and holes 20 in one arm 21 of the C-clamp. The other arm 22 of the C-clamp is provided with a bolt 23 threaded through opening 22a. The bolt 23 is provided on one end with a head 24 to receive a wrench and on the other with a swivel head 25. The flange 10 is preferably provided with supporting lugs 26 on the bottom edge thereof to aid in supporting the flange to be connected.

When it is desired to connect a flanged end such as a flange 27 of hose 28 to the flange 10, the flange 27 is placed on lugs 26 and brought into face-to-face contact with flange 10 with the outer peripheries of the flanges in alignment. C-clamp 17 is pivoted to bring swivel head 25 on bolt 23 behind flange 27. The bolt 23 is turned to force flange 27 into contact with flange 10.

In the embodiment shown in FIGURE 5, I have illustrated a flange 30. A pair of semi-circular members 31 are placed behind flange 30 with lugs 32 resting on opposite sides of flange 30. Bolts 33 are fixed through openings 34 in end lugs 35 on the end of each semi-circular member and tightened in nuts 36 to hold the members 31 in place. Each member 31 is provided with paired lugs 37 adapted to receive one end 38 of C-clamp 39 between them and pivoted on pin 40. The opposite end of C-clamp 39 is provided with a bolt 23a threaded into openings 39a. The bolt 23a is identical with bolt 23 of FIGURES 1-4 and is provided with a head 24a to receive a wrench and a swivel head 25a to bear on a flange to be attached. The operation of the embodiment of FIGURE 5 is the same as that described for FIGURES 1-4.

In FIGURE 7 I have illustrated an alternative form of pivot member 13a held in bolt hole 12a in flange 10a by means of an expandable knurled annular partially split ring 41 which is forced to expand by riding up a conical shoulder 42 on the pivot member by means of a screw 43 threaded into a threaded opening axially of shoulder 42. A C-clamp such as 17 of FIGURES 1-4 is modified at the end 21a by forming a clevis 44 adapted to receive pivot member 13a and be pivoted thereon by pin 45.

While I have illustrated and described a present preferred embodiment of my invention it will be understood that this invention may be otherwise embodied within the scope of the following claims.

I claim:

1. A flange coupling for pipes comprising in combination a pair of flanges at least one having spaced holes therein, a yoke member at each of said spaced holes having a conical neck adapted to enter said holes, an expansible annular toothed ring surrounding the conical neck and having a diameter slightly smaller than the bolt hole, means on the neck for urging the annular ring onto the conical neck to expand the ring into engagement with the interior of the bolt hole, a C-clamp member pivoted at one leg in each yoke adapted to pivot over the flanges with a leg on each opposite side of the pair of flanges and screw means in the other leg of the C-clamp member movable on the axis of the bolt hole to exert pressure between the legs of the C-clamp on the two flanges to urge them together.

2. A coupling as claimed in claim 1 wherein said one flange is provided with axially extending support legs to supportingly receive said other flange.

References Cited by the Examiner
UNITED STATES PATENTS

| | | | |
|---|---|---|---|
| 409,512 | 8/89 | Smith | 285—364 |
| 612,316 | 10/98 | Downes. | |
| 1,150,843 | 8/15 | Draper | 285—406 |
| 1,191,503 | 7/16 | Ford | 285—30 |
| 1,398,054 | 11/21 | Abegg. | |
| 1,603,241 | 10/26 | McLean | 285—363 |
| 1,812,678 | 6/31 | Bernert | 285—420 |
| 1,813,193 | 7/31 | Nixon | 287—52.06 |
| 1,959,439 | 5/34 | McIntosh. | |
| 2,057,771 | 10/36 | Elkins | 285—325 |
| 2,456,744 | 12/48 | Sjoberg | 285—261 |
| 2,536,602 | 1/51 | Goett | 285—364 |

FOREIGN PATENTS

| | | |
|---|---|---|
| 1,178,804 | 12/58 | France. |
| 177,096 | 3/22 | Great Britain. |
| 438,828 | 8/48 | Italy. |

CARL W. TOMLIN, *Primary Examiner.*